US008798442B2

United States Patent
Wilson et al.

(10) Patent No.: US 8,798,442 B2
(45) Date of Patent: Aug. 5, 2014

(54) SYSTEM, METHOD AND COMPUTER PROGRAM PRODUCT FOR UPDATING ADVERTISING DATA FOR RECORDED VIDEO DATA

(75) Inventors: Brian Wilson, Liberty, MO (US); Frank Coppa, Kansas City, MO (US); Larry Kennedy, Lawrence, KS (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 361 days.

(21) Appl. No.: 12/636,717

(22) Filed: Dec. 12, 2009

(65) Prior Publication Data

US 2011/0142417 A1 Jun. 16, 2011

(51) Int. Cl.
*H04N 5/76* (2006.01)
*H04N 21/44* (2011.01)
*H04N 21/433* (2011.01)
*H04N 21/81* (2011.01)

(52) U.S. Cl.
CPC ........... *H04N 5/76* (2013.01); *H04N 21/44016* (2013.01); *H04N 21/4334* (2013.01); *H04N 21/812* (2013.01); *H04N 21/44088* (2013.01)
USPC ......................................... 386/250; 386/249

(58) Field of Classification Search
CPC ... H04N 5/76; H04N 21/4334; H04N 21/812; H04N 21/44016; H04N 21/44008
USPC ......................................... 386/249–250, 345
See application file for complete search history.

(56) References Cited

U.S. PATENT DOCUMENTS

| 6,370,325 | B2 | 4/2002 | Nakatani | |
|---|---|---|---|---|
| 7,027,719 | B1 | 4/2006 | Schneider et al. | |
| 7,694,318 | B2 * | 4/2010 | Konig et al. | 725/32 |
| 8,060,407 | B1 * | 11/2011 | Delker et al. | 705/14.68 |
| 8,127,328 | B2 * | 2/2012 | Jacobs | 725/36 |
| 8,490,127 | B2 * | 7/2013 | Vantalon et al. | 725/31 |
| 2002/0040475 | A1 | 4/2002 | Yap | |
| 2002/0054750 | A1 | 5/2002 | Ficco | |

* cited by examiner

*Primary Examiner* — William C Vaughn, Jr.
*Assistant Examiner* — Naod Belai
(74) *Attorney, Agent, or Firm* — G. Michael Roebuck

(57) ABSTRACT

A method is disclosed including but not limited to, receiving a video data stream at a multimedia processor end user device; storing the video data stream at a digital video recorder; monitoring a playback of the stored video data stream at the multimedia processor end user device; detecting an advertising trigger in the playback of the video data stream at the multimedia processor end user device; logging a time for the trigger detected in the video data stream in a trigger log at the multimedia processor end user device; sending the trigger log including data to an advertising server so that the advertising verification system can correlate the time the trigger occurred with an advertising schedule; receiving a replacement advertising data stream from the advertising server based on the advertising trigger; and receiving a replacement advertising data stream during the playback of the video data.

12 Claims, 6 Drawing Sheets

SYSTEM, METHOD AND COMPUTER PROGRAM PRODUCT FOR UPDATING ADVERTISING DATA FOR RECORDED VIDEO DATA

FIELD OF THE DISCLOSURE

The present disclosure relates to the field of advertising and in particular to updating advertising for recorded video during playback.

BACKGROUND OF THE DISCLOSURE

Advertisers purchase advertisement space or spots in television programs that are recorded on digital video recorders (DVRs). The television broadcast stations make up a schedule of advertisements and the programs in which the advertisements are to appear. The playback often occurs at a later date, making an advertisement previously recorded with the content, out of date.

DETAILED DESCRIPTION

Figure 1:
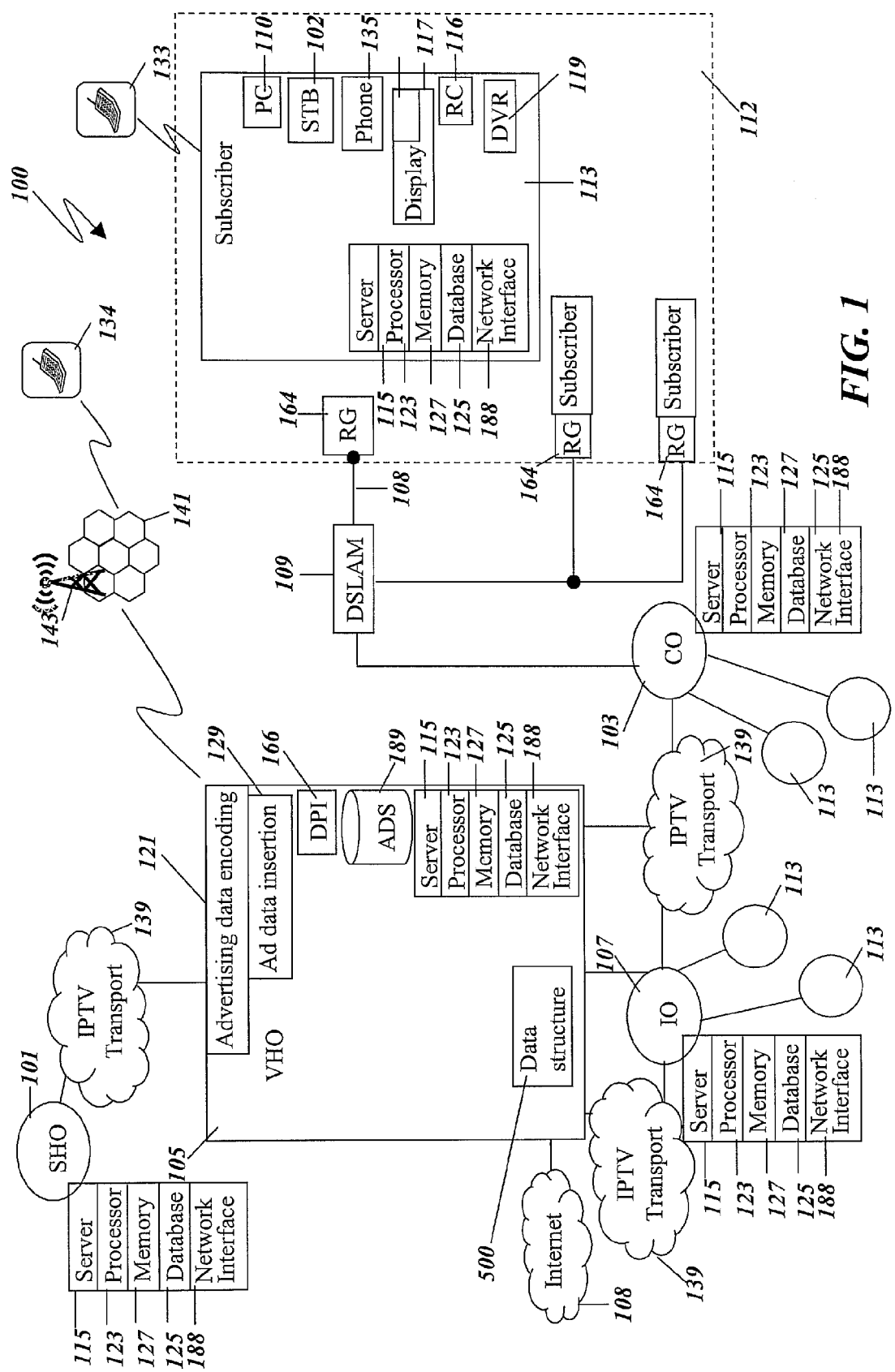
FIG. 1 depicts an illustrative embodiment of a system for updating video and advertising data.

During the playback of recorded TV programs through an internet protocol television (IPTV) DVR set top box, the playback video stream of the recorded content contains stored SCTE 35 tags that can be utilized to trigger newer advertising events and sent upstream to signal delivery of replacement advertising based on conditions existing during playback and in accordance with a playback advertising schedule (PAS). The stored video content via stored SCTE 35 triggers or other messaging techniques can trigger advertising delivery to an end user device such an STB associated with a DVR for playback along with the stored video content stored on the STB DVR or through an advertising server based in an IPTV system.

An illustrative embodiment of the system, method and computer program product permits advertisers to deliver current advertising in place of older original advertising data that were recorded along with the video on the DVR during the original recorded event. By delivering a new commercial in an older recorded movie or video data, advertisers have an opportunity to present current advertising data and information increasing the opportunity for both the IPTV service company and the advertisers to generate new revenue streams based on the new advertising sent to the end user device during DVR playback of the recorded data.

By inserting a new updated advertising data, which may be in the form of a commercial, advertisers will have the opportunity to increase revenues from delivering new advertisement in place of the old recorded advertisements recorded in the DVR content. The old recorded DVR content will contain the recorded SCTE 35 tag's which are stripped out the STB and sent to an advertising server to trigger the replacement advertising data to be to be streamed to the STB during playback of the old recorded DVR content, for example, video data. Both advertisers and the company will have increased opportunities to sell new advertisers from old recorded DVR content.

An illustrative embodiment further ensures that companies have an opportunity to continue to invest in improving television advertising by giving the advertisers a new avenue for displaying new paid advertising in older recorded content. While the new ad is playing the subscriber cannot fast forward and bypass the commercial since it is a live feed such as a video stream. In another illustrative embodiment, the set top box can store on the DVR a variety of updated advertising data to play out live or can be retrieved from a network advertising server. The advertising can be sent and stored at anytime on the Set top Box DVR. The older recorded movies or events have stored SCTE 35 recorded tags that can trigger the new event. Advertising can be generated and target specific events, such as a movie, sports or boxing event that generate high advertising revenues.

An illustrative embodiment generates a new revenue stream and a new way to advertise using old recorded content on the DVR to revolutionize advertising through recorded DVR content. Advertisers maintain value using new and timely advertising while for older recorded content. Additionally, subscribers cannot fast forward during the live presentation of the playback advertising data stream. An illustrative embodiment uses existing stored SCTE 35 tags to trigger streaming of new updated advertising from the advertising server. Updated advertising data can also be stored on allocated DVR storage. Updated advertising is streamed to the STV by remote advertising server in the IPTV system. During the playback of recorded video data, such as TV programs through IPTV DVR set top boxes content contains stored SCTE 35 tags that can be utilized to trigger newer advertising events. The stored content via SCTE 35 or other messaging techniques can trigger advertising playback along with stored content on the STB DVR through an advertising server in the IPTV system. In another illustrative embodiment, the streaming advertising server is based at the STB.

An illustrative embodiment permits advertisers to stream current advertising in place of advertisement data that were recorded during the original recorded event. By streaming a new commercial in an older recorded movie, advertisers have an opportunity to present current ad information increasing the opportunity for both the company and advertisers to generate new revenue streams. By streaming new updated advertising data, advertisers will have the opportunity to increase revenues from playing/streaming new advertising data to STBs during replay of older recorded DVR video data content. The older recorded DVR content will contain the original SCTE 35 tag's to trigger the advertisements to be streamed during playback of the recorded video data.

A mapping between the original tags identifying original advertising data and new tags identifying new replay advertising data is kept in a data structure in a computer readable medium in the advertising server. Both advertisers and the company will have increased opportunities to sell new advertising data which is streamed during replay of old recorded DVR content. This will also ensure that companies continue to invest in television advertising by giving the companies a new avenue for displaying new paid advertising during replay of older content data. While the new advertisement is playing the subscriber cannot fast forward and bypass the commercial since it is a live advertising data stream feed being streamed to the STB containing the DVR. The set top box can store via the DVR a variety of advertising to play out or can be retrieved from a network server. The advertising can be streamed live during ad avails identified by the advertising triggers. In another embodiment, the new advertising data is sent and stored at anytime on the Set top Box DVR. In this case, during replay of the DVR stored advertising data, fast forward is disabled for the DVR. The older recorded movies or events have stored SCTE 35 recorded tags that can trigger playing the new advertising data during replay of the recorded data. Advertising can be generated and target specific events, such as a movie, sports or boxing event that generates high advertising revenues.

In an illustrative embodiment advertising triggers are inserted into video stream and stored on a DVR. When the stored video data stream is played back, the playback of the recorded video data stream includes the stored advertising signals/triggers indicating when and which advertising should be inserted into the video data stream. As the content has been recorded, the advertising may no longer be timely when played back at a later date. For example, advertising for "next weeks coming attractions" are out of date two weeks later when the recorded content is played back from a DVR. The SCTE 35 and SCTE signaling (also referred to herein as advertising triggers) embedded in the video data is passed through the IPTV network to the STB and DVR. The SCTE 35 and related SCTE signaling is recorded in the programming content and both stored on the DVR. When the recorded programming is played back from the DVR, the embedded SCTE 35 advertising triggers are sensed by the ADS chip in the STB which acts upon the advertising trigger to communicate upstream to the ADS server upstream.

The ADS delivery server communicates to both the ACM billing system and acquires the new advertisement from an advertising server to be played from a local VHO play out server or a national centralized play out server. The ADS chipset in the STB switches the programming from the original recorded content to the newly inserted advertising content received from the centralized or local play out server. The STB accommodates SCTE35 event logging so confirmation of the play out can be verified. The SCTE 35 signaling is passed through the IPTV network to the STB and associated DVR. The SCTE 35 is recorded in the programming content and stored on the DVR. When the recorded programming is played back the embedded SCTE35 triggers the ADS chip in the STB to communicate upstream to the ADS server. The ADS delivery servers communicates to both the ACM billing system and acquires the new advertising data to be played from a local VHO play out server or the national centralized play out server. The ADS chipset in the STB switches the programming from the original recorded content to the newly inserted ad content received from the centralized or local play out server. The STB should accommodate SCTE35 event logging so confirmation of the play out can be verified. (This should be required for local ad insertion currently being considered as a STB solution) Logging should be a mandatory feature.

The advertising triggers may be a Society for Cable Television Engineers (SCTE) 104 trigger, a SCTE 35 or a SCTE 30 trigger. The specifications for these triggers are discussed at length in the SCTE 35 American National Standards Institute (ANSI) standard, the SCTE 30 ANSI standard and the SCTE 104 ANSI standards, all of which ANSI standards are hereby incorporated by reference herein. In a particular illustrative embodiment, a SCTE trigger is embedded in the vertical ancillary data (VANC) data of an ASI, SDI or HDSDI video data stream. The trigger is detected and logged in a trigger log. In another embodiment an advertising identifier is associated with the advertising data. The advertising identifier is a unique identifier given to the advertising data when it is accepted into the data distribution system for dissemination. The data distribution network, such as an interne protocol television (IPTV) network sends video data streams to end user devices which receive, decode and display the video data for viewing by network subscribers.

The present example is a particular illustrative embodiment which uses and IPTV network as an example of implementation. Other illustrative embodiments may employ different data distribution networks such as cable television networks, satellite networks or the Internet. In the present illustrative embodiment, advertising triggers are detected and logged at various network levels in the hierarchically arranged set of servers in the IPTV network as well as at the end user device. The trigger logs for each of the servers are and the trigger logs for the end user device are compared to the Advertising Schedule associated with the network level at which the trigger logs is created including the end user device. Thus a national Playback Advertising Schedule for advertisements disseminated from the IPTV network at the national network level to all end user devices is compared to a trigger log from a sampling of end user devices that received a particular advertisement in the national network Playback Advertising Schedule to verify that the end user device received a trigger for the national advertisement when playing back the stored content from the DVR.

A regional Playback Advertising Schedule for advertisements disseminated from the IPTV network at the regional network level to regional end user devices is compared to a trigger log from a sampling of end user devices that received a particular advertisement in the regional network Playback Advertising Schedule to verify that the end user device received a trigger for the regional advertisement. A targeted Playback Advertising Schedule for advertisements disseminated from the IPTV network at the local or regional network level to a set of targeted end user devices is compared to a trigger log from a sampling of targeted end user devices that received a particular advertisement in the targeted network Playback Advertising Schedule to verify that the end user device received a trigger for the targeted advertisement.

In another embodiment, an advertising identifier is inserted into the video data stream along with the trigger to identify the advertisement which is to be inserted or has been inserted into the video data stream. Thus, an advertising insertion device can detect the trigger and insert the identified advertisement into the video data stream or identify the advertisement already inserted into the video data stream. An indicator can be included to signal the advertising playback device whether or not to playback the advertisement form an IPTV system advertising server or from advertising data stored on the DVR. The advertising server then logs the occurrence of the trigger, the time of the occurrence and the identifier for the advertisement into an As Run Log. The various network levels in the IPTV network including the end user device (STB) generate both a trigger log and an As Run Log.

In another embodiment, a national Playback Advertising Schedule for advertisements disseminated from the IPTV network at the national network level to all end user devices is compared to an As Run Log from a sampling of end user devices that were scheduled received a particular advertisement in the national network Playback Advertising Schedule to verify that the end user device received the particular national advertisement. In another embodiment, a regional Playback Advertising Schedule for advertisements disseminated from the IPTV network at the regional network level to regional end user devices is compared to an As Run Log from a sampling of end user devices that were scheduled received a particular advertisement in the regional network Playback Advertising Schedule to verify that the end user device received the particular regional advertisement.

In another embodiment, a targeted Playback Advertising Schedule for advertisements disseminated from the IPTV network at the local or regional level to one or more targeted end user devices is compared to an As Run Log from a sampling of end user devices that were scheduled to receive a particular advertisement in the targeted Playback Advertising Schedule to verify that the end user device received the particular targeted advertisement.

In a particular illustrative embodiment, a SCTE trigger is embedded in the vertical ancillary data (VANC) data of an asynchronous serial interface (ASI), serial digital interface (SDI) or high definition SDI (HDSDI) video data stream. The Serial Digital Interface (SDI), standardized in ITU-R BT.656 and SMP 259M, is a digital video interface used for broadcast-grade video. For standard definition applications, as defined by SMPTE 259M, some of the possible bit rates are 270 Mbps, 360 Mbps, 143 Mbps, and 177 Mbps. 270 Mbps is by far the most commonly used; though the 360 Mbps interface (used for widescreen standard definition) is sometimes encountered. DVB-ASI (Digital Video Broadcasting—Asynchronous Serial Interface) is frequently used in satellite transmission, inter facility links, and telephony communications. DVB-ASI is designed to transport MPEG-2 video streams, primarily for television applications, at up to 270 Mbps. The electrical implementation of DVB-ASI is similar to serial digital interface (SDI). DVB-ASI is carried at a 270 Mbps line rate consistent with the SDI clock described in SMPTE 259M.

In another embodiment, the SCTE trigger appears within the first few lines of video data during playback of the stored video data from the DVR. The trigger is detected and logged in a trigger log and sent to the advertising server. In another embodiment an advertising identifier is associated with the advertising data. The advertising identifier is a unique identifier given to the advertising data when it is accepted into the data distribution system for dissemination. The data distribution network, such as an internet protocol television (IPTV) network sends video data streams to end user devices which receive, decode and display the video data for viewing by network subscribers.

The present example is a particular illustrative embodiment which uses an IPTV network as an example of implementation. Other illustrative embodiments may employ different data distribution networks such as cable television networks, satellite networks or the Internet. In the present illustrative embodiment, advertising triggers are detected and logged at various network levels in the hierarchically arranged set of servers in the IPTV network as well as at the end user device. The trigger logs for each of the servers and the trigger logs for the end user device are compared to the Advertising Schedule associated with the network level at which the trigger log was created including the end user device. Thus a national Advertising Playback Schedule for advertisements disseminated from the IPTV network at the national network level to all end user devices is compared to a trigger log from a sampling of end user devices that received a particular advertisement in the national network Advertising Playback Schedule during playback of recorded video data to verify that the end user device received a trigger for the national advertisement in response to the detection of a SCTE or other advertising trigger in the video data during the playback of the recorded video data.

A regional Playback Advertising Schedule for advertisements disseminated from the IPTV network at the regional network level to regional end user devices is compared to a trigger log from a sampling of end user devices that received a particular advertisement in the regional network Playback Advertising Schedule to verify that the end user device received a trigger for the regional advertisement. A targeted Playback Advertising Schedule for advertisements disseminated from the IPTV network at the local or regional network level to a set of targeted end user devices is compared to a trigger log from a sampling of targeted end user devices that received a particular advertisement in the targeted network Playback Advertising Schedule to verify that the end user device received a trigger for the targeted advertisement.

In another embodiment, an advertising identifier is inserted into the video data stream along with the trigger to identify the advertisement which is to be inserted or has been inserted into the video data stream during play back of the recorded video data stream. The inserted advertisement is not prerecorded data, but rather is streamed live to the end user device and thus cannot be accelerated by a fast forward command at the DVR.

An advertising playback device can detect the advertising trigger and receive the identified advertisement in the video data stream or identify an advertisement already inserted into the playback of the recorded video data stream. An indicator can be included to signal the advertising playback device whether or not to insert the advertisement or whether it has already been inserted or send the video data stream separately for reception and playback at the STB associated with the DVR from which the video data is being replayed. The advertising insertion device then logs the occurrence of the trigger, the time of the occurrence and the identifier for the advertisement received into an As Run log. The various network levels in the IPTV network including the end user device (STB) generate both a trigger log and an As Run Log for advertisements inserted into a playback stream for a prerecorded video data.

In an illustrative embodiment an Industry Standard Commercial Identifier (ISCI) code is used as the advertising identifier. An ISCI code conforms to a standard used to identify commercial avails (aka "spots") aired on commercial television worldwide, for TV stations, ad agencies, video post-production houses, radio stations and other related entities to identify commercials for airing. It was first developed in 1970 by and for American local affiliate TV stations, the TV networks that serve the affiliates, and ad agencies, to distribute commercial television advertisements more efficiently. The ISCI coding system has been maintained and operated by the American Association of Advertising Agencies (AAAA) and the Association of National Advertisers (ANA) since 1992. Prior to then, ISCI was independently maintained by its users.

An ISCI code is usually a set of 8 characters, the first four being alphabetic, and the remaining four being numeric, in the format 'ABCD1234'. The alphabetical characters usually represent the advertiser (some examples are QWAN for Wells Fargo Bank™, KOCL (and more recently CL) for Coca-Cola™, and PEMX for Pepsi™), and the numeric characters usually represent the spot itself, with different numbers used for either different spots, or different versions of the same spot. For example, a 30 second spot might have a code of XECA1263, while the same commercial in a shortened: 20 or: 15 version (or in a different language such as Spanish) might have a slightly different code of XECA1264. The ISCI code is unique to each individual commercial. The slightest change to an ad will lead to the use of another code. In some cases where a spot is updated or changed or subject to change the suffix R followed by a number indicates a revision. For example, YHTX6265 would be the ISCI used by Home Depot™ for a garden product. If the price changed and the ad was the same otherwise, YHTX6265R1 may be used to indicate that it is the first revision of that spot. ISCI codes are usually printed on the video cassette label of a commercial.

Playback Advertising Schedules are provided and used to indicate advertisements and the programs and times within the programs into which they are to be streamed or inserted during playback. The Playback Advertising Schedule is divided into hierarchical segments for national, regional, local and targeted advertisements. Some or all of the national, regional, local and targeted playback advertisement schedules are compared to hierarchical national, regional, local and targeted advertisement trigger logs to verify that a trigger was received and logged for particular advertisements scheduled in the national, regional, local and targeted advertisement schedules. Each of the national, regional, local and targeted Playback advertisement schedules are compared to hierarchical national, regional, local and targeted advertisement As Run logs to verify that a particular advertisement was received and logged for each advertisement in each of the national, regional, local and targeted advertisement schedules.

In another embodiment, a national Playback Advertising Schedule for advertisements disseminated from the IPTV network at the national network level to all end user devices during playback of recorded video data is compared to an As Run log from a sampling of end user devices that were scheduled to receive a particular advertisement during playback in the national network Playback Advertising Schedule to verify that the end user device received the particular national advertisement during playback. In another embodiment, a regional Playback Advertising Schedule for advertisements disseminated from the IPTV network at the regional network level to regional end user devices is compared to an As Run log from a sampling of end user devices that were scheduled to receive a particular advertisement during playback in the regional network Advertising Schedule to verify that the end user device received the particular regional advertisement during playback.

In another embodiment, a targeted Advertising Schedule for advertisements disseminated from the IPTV network at the local or regional level to one or more targeted end user devices is compared to an As Run log from a sampling of end user devices that were scheduled to receive a particular advertisement in the targeted Playback Advertising Schedule to verify that the end user device received the particular targeted advertisement. The end user device, in the present example is a multimedia processor end user device set top box. Multimedia processor end user devices are capable of receiving a video data stream including audio and presenting the video and audio as a displayed and audio presentation at the multimedia processor end user device or a peripheral device in data communication with the multimedia processor end user device. The multimedia processor end user device may also be selected from a group of devices including but not limited to a cell phone, portable computer, personal data assistant, personal computer or personal media player.

In a particular illustrative embodiment, a method is disclosed for advertising, the method including but not limited to, receiving from a data distribution server, a video data stream at a multimedia processor end user device; storing the video data stream at a digital video recorder; monitoring a playback of the stored video data stream from the digital video recorder at the multimedia processor end user device; detecting an advertising trigger in the playback of the video data stream at the multimedia processor end user device; logging a time for the trigger detected in the video data stream in a trigger log at the multimedia processor end user device; sending the trigger log including data to an advertising server so that the advertising verification system can correlate the time the trigger occurred with an advertising schedule; receiving a replacement advertising data stream from the advertising server based on the advertising trigger; and receiving a replacement advertising data stream during the playback of the video data stream from the DVR.

In another illustrative embodiment of the method, the method further includes but is not limited to suspending fast forward commands on the DVR during the streaming of the replacement advertising data stream. In another illustrative embodiment of the method, the method further includes but is not limited to reading at the multimedia processor end user device, a playback advertising identifier in the advertising video data stream associated with the trigger detected from the replacement advertising video data stream, the advertising identifier indicating particular advertising data being streamed by an advertising server in the data distribution system; logging the advertising identifier with the trigger detected and time of day in an As Run Log at the end user device; and sending the As Run Log to the data distribution system server.

In another illustrative embodiment of the method, the trigger is a Society for Cable Television Engineers (SCTE) 104 trigger and the video data stream is a SDI video data stream. In another illustrative embodiment of the method, the trigger is a SCTE 35 trigger and the video data stream is an ASI video data stream. In another illustrative embodiment of the method, the advertising identifier is an international standard code identifier (ISCI) code assigned to the advertising data and inserted into the video data stream in the data distribution system server.

In another illustrative embodiment of the a computer readable medium is disclosed, containing computer executable instructions that when executed by a processor perform functions uses advertising during replay of recorded data, the computer program including but not limited to instructions to receive from a data distribution server, a video data stream at a multimedia processor end user device; instructions to store the video data stream at a digital video recorder; instructions to monitor a playback of the stored video data stream from the digital video recorder at the multimedia processor end user device; instructions to detect an advertising trigger in the playback of the video data stream at the multimedia processor end user device; instructions to log a time for the trigger detected in the video data stream in a trigger log at the multimedia processor end user device; instructions to send the trigger log including data to an advertising server so that the advertising verification system can correlate the time the trigger occurred with an advertising schedule; and instructions to receive a replacement advertising data stream from the advertising server based on the advertising trigger during the playback of the video data stream from the DVR.

In another illustrative embodiment of the medium, the computer program further includes but is not limited to instructions to suspend fast forward commands on the DVR during the streaming of the replacement advertising data stream. In another illustrative embodiment of the medium, the computer program further includes but is not limited to instructions to read at the multimedia processor end user device, a playback advertising identifier in the advertising video data stream associated with the trigger detected from the replacement advertising video data stream, the advertising identifier indicating particular advertising data being streamed by an advertising server in the data distribution system; instructions to log the advertising identifier with the trigger detected and time of day in an As Run Log at the end user device; and instructions to send the As Run Log to the data distribution system server. In another illustrative embodiment of the medium, the trigger is a Society for Cable Television Engineers (SCTE) 104 trigger and the video data stream is a SDI video data stream.

In another illustrative embodiment of the medium, the trigger is a SCTE 35 trigger and the video data stream is an ASI video data stream. In another illustrative embodiment of the medium, the advertising identifier is an international standard code identifier (ISCI) code assigned to the advertising data and inserted into the video data stream in the data distribution system server.

In another illustrative embodiment, a computer program product is disclosed, the computer program product including but not limited to a processor in data communication with a computer readable medium; and a computer program embedded in the computer readable medium, the computer program comprising computer executable instructions that when executed by a processor perform functions uses advertising during replay of recorded data, the computer program including but not limited to instructions to receive from a data distribution server, a video data stream at a multimedia processor end user device; instructions to store the video data stream at a digital video recorder; instructions to monitor a playback of the stored video data stream from the digital video recorder at the multimedia processor end user device; instructions to detect an advertising trigger in the playback of the video data stream at the multimedia processor end user device; instructions to log a time for the trigger detected in the video data stream in a trigger log at the multimedia processor end user device; instructions to send the trigger log including data to an advertising server so that the advertising verification system can correlate the time the trigger occurred with an advertising schedule; and instructions to receive a replacement advertising data stream from the advertising server based on the advertising trigger during the playback of the video data stream from the DVR. In another illustrative embodiment of the computer program product, the computer program further includes but is not limited to instructions to suspend fast forward commands on the DVR during the streaming of the replacement advertising data stream. In another illustrative embodiment of the medium, the computer program further includes but is not limited to instructions to read at the multimedia processor end user device, a playback advertising identifier in the advertising video data stream associated with the trigger detected from the replacement advertising video data stream, the advertising identifier indicating particular advertising data being streamed by an advertising server in the data distribution system; instructions to log the advertising identifier with the trigger detected and time of day in an As Run Log at the end user device; and instructions to send the As Run Log to the data distribution system server. In another illustrative embodiment of the computer program product, the trigger is a Society for Cable Television Engineers (SCTE) 104 trigger and the video data stream is a SDI video data stream. In another illustrative embodiment of the computer program product, the trigger is a SCTE 35 trigger and the video data stream is an ASI video data stream. In another illustrative embodiment of the computer program product, the advertising identifier is an international standard code identifier (ISCI) code assigned to the advertising data and inserted into the video data stream in the data distribution system server.

Turning now to FIG. 1, an illustrative embodiment of an IPTV system 100 is depicted. In an illustrative IPTV system, 100 delivers video data including but not limited to video data content and advertising data to subscriber households 113 and associated multimedia processor end user devices (also referred to herein as subscriber or client devices) which may be inside or outside of the household. The video data further includes but is not limited to ASI video streams, SDI video streams and HDSDI video streams.

In the IPTV system, IPTV channels are first broadcast in an internet protocol (IP) from a server at a super hub office (SHO) 101 (national level) to an IPTV video hub office (VHO) server 103 (regional level), to an intermediate office (IO) server 107 (local level) and to a central office (CO) 103 (individual targeted level). The IPTV system provides ASI, SDI and HD SDI video data to the multimedia processor end user devices. The IPTV system 100 includes a hierarchically arranged network of servers wherein a particular embodiment the SHO transmits video and advertising data to a video hub office (VHO) 103 and the VHO transmits to another server location closer to an end user device/subscriber, such as a CO server 103 or IO 107. In another particular embodiment, each of the SHO, VHO, CO and IO are interconnected with an IPTV transport 139. The IPTV transport 139 may consist of high speed fiber optic cables interconnected with routers for transmission of Internet protocol data. The IPTV servers also provide data communication for Internet and VoIP services to subscribers.

Actively viewed IPTV channels data are sent in an Internet protocol (IP) data multicast group to access nodes such as digital subscriber line access multiplexer (DSLAM) 109. A multicast for a particular IPTV channel is joined by the set-top boxes (STBs) at IPTV subscriber homes from the DSLAM. Each SHO, VHO, CO, IO and STB includes a server 115, processor 123, a memory 127, network interface 188 and a database 125. The network interface functions to send and receive data over the IPTV transport. The CO server delivers IPTV, Internet and VoIP content to the subscriber via the IO and DSLAM. The television content is delivered via multicast and television advertising data via unicast or multicast depending on a target television advertising group of end user client subscriber devices to which the advertising data is directed. The IPTV network keeps track of which stream are being sent to each STB at the national, regional, local and individual targeted level at the VHO, RHO, IO and CO respectively.

In another particular embodiment, client devices, also referred to herein as multimedia processor end user devices, are different stationary and mobile devices, including but not limited to, wire line phones 135, portable phones 133, lap top computers 118, personal computers (PC) 110 and STBs 102, 119 which communicate with the data distribution network i.e., IPTV network through residential gateway (RG) 164 and high speed communication lines such as IPTV transport 139. In another particular embodiment, DPI devices 166 inspect data VoIP, Internet data and IPTV video, commands and Meta data (multicast and unicast) between the subscriber devices and the IPTV system severs.

In another particular embodiment, the end user devices or subscriber devices include but are not limited to a client user computer, a personal computer (PC) 110, a tablet PC, a set-top box (STB) 102, a Personal Digital Assistant (PDA), a cellular telephone 134, a mobile device 134, a palmtop computer 134, a laptop computer 110, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. In another particular embodiment, a deep packet inspection (DPI) device 124 inspects multicast and unicast data, including but not limited to VoIP data, Internet data and IPTV video, commands and Meta data between the subscriber devices and between subscriber devices and the IPTV system severs.

As shown in FIG. 1 STB groups 112 (comprising a group of subscriber house holds 113) receive multicast and unicast advertising data in video data streams from IO server 107 via CO 103 and DSLAM 109 at STB 102. In a particular illustrative embodiment, a video data stream is stored on the digital video recorder (DVR) 119. In another particular embodiment, each STB is configured to perform DVR functionality using memory, processor and data base on board the STB to store the video data along with embedded triggers in the video data on the DVR 119. Individual households 113 receive video data at set top box 102 or one of the other client devices. More than one STB (see STB1 102 and STB2 119) can be located in an individual household 113 and each individual STB can receive a separate multicast or unicast video stream on IPTV transport 139 through DSLAM 109. In a particular embodiment, advertising data encoding 121 and advertising data insertion 129 are provided in VHO 105.

In another particular illustrative embodiment separate and unique advertising data are displayed at each set top box (STB) 102, 119 tailored to target the particular subscriber watching television at that particular STB. Each STB 102, 119 have an associated remote control (RC) 116 and video display 117. The subscriber via the RC selects channels for a video data viewing selection (video programs, games, movies, video on demand), initiates trick play commands data to the STB/DVR and places orders for products and services over the IPTV system 100. In a particular embodiment, an advertisement verification system (AVS) 204 runs on the server processor 123. The DVR plays back the video data stored on the DVR along with advertising triggers in the embedded in the stored video data. The advertising triggers are detected at the DVR play back at the STB and reported upstream to an advertising server 189 which then supplies a replacement advertising data stream based on the Playback Advertising Schedule.

Figure 2:
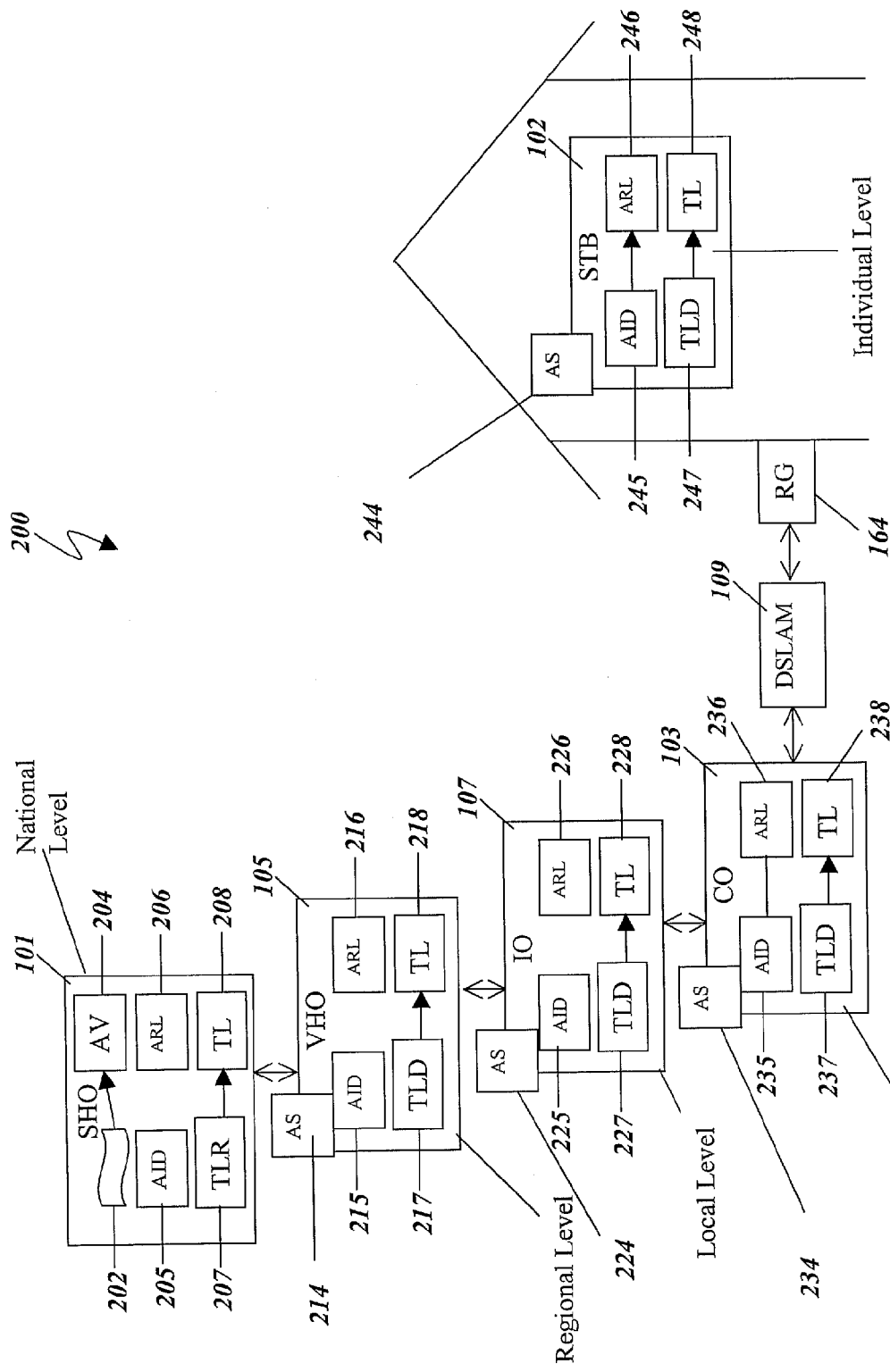
FIG. 2 depicts an illustrative embodiment of a system for delivering advertising data during playback of video data from a DVR using triggers stored in the stored video data.

Turning now to FIG. 2, as shown in FIG. 2, each hierarchical IPTV network level as well as the end user level include but are not limited to an Advertising Insertion Device (AID) which functions to detect advertisement identifiers in a particular video data stream associated with advertising triggers in the particular video data stream and log the advertisement identifier, time of day and video stream identifier in an As Run Log(ARL). Each hierarchical IPTV network level as well as the end user level include but are not limited to a Trigger Logging Device (TLD) which functions to detect and log advertising triggers in a particular video data stream associated and log the advertising trigger, time of day and video stream identifier in a Trigger Log(TL). Thus triggers and advertisements are monitored and logged in an ARL and TL at each hierarchical level in the IPTV network, national, regional, local and individual targeted as well as at the STB. Processor and computer readable media and data bases are provided at each level of the IPTV network including the STB as shown in FIG. 1. The AID and TLD operate as individual devices at each hierarchical level of the IPTV network and at the STB. In another embodiment, the AID and TLD operate in processors at each hierarchical level of the IPTV network and at the STB. The ARL and TL are stored in a computer readable medium at each hierarchical level of the IPTV network and at the STB.

As shown in FIG. 2, the SHO includes but is not limited to an AVS 204, AID 205, ARL 206, TLD 207 and TL 208. At the SHO, the TLD logs triggers as they occur in the TL storing the time of day, video stream identifier and a TLD identifier for use later in the AVS for verifying that a trigger was sent for a particular advertisement at a particular IPTV network level or multimedia processor end user device. The VHO includes but is not limited to an AID 215, ARL 216, TLD 217 and TL 218. At the VHO, the TLD logs the triggers as they occur in the TL storing the time of day, video stream identifier and a TLD identifier for use later in the AVS for verifying that a trigger was sent for a particular advertisement at a particular IPTV network level or multimedia processor end user device.

The IO includes but is not limited to an AID 225, ARL 226, TLD 227 and TL 228. At the IO, the TLD logs triggers as they occur in the TL storing the time of day, video stream identifier and a TLD identifier for use later in verifying trigger were sent for a particular advertisement at a particular IPTV network level or multimedia processor end user device. The CO includes but is not limited to an AID 235, ARL 236, TLD 237 and TL 238. At the CO, the TLD logs triggers as they occur in the TL storing the time of day, video stream identifier and a TLD identifier for use later in verifying trigger were sent for a particular advertisement at a particular IPTV network level or multimedia processor end user device. The STB includes but is not limited to an AID 245, ARL 246, TLD 247 and TL 248. At the STB, the TLD logs triggers as they occur in the TL storing the time of day, video stream identifier and a TLD identifier for use later in verifying trigger were sent for a particular advertisement at a particular IPTV network level or multimedia processor end user device. In another embodiment, an AVS is provided at each of the SHO, VHO, IO and CO.

A Playback Advertisement Schedule including but not limited to advertisement identifiers, program placement identifiers, program placement stream identifiers and time of day is stored at the SHO and used by the AID at the SHO to insert or stream advertising data, advertising triggers and advertising identifiers into the video data stream which is then sent to the VHO at next lower hierarchical network level in the IPTV network. The Playback Advertisement Schedule (PAS) is later compared in an AVS to TLs at each IPTV network level including the individual level at STBs to verify that the triggers were received. In another embodiment the Advertisement Schedule is later compared to ARLs in an AVS at each IPTV network level including the individual level at STBs to verify that the advertisements in the PAS were received. The PAS, ARL and TL are stored in data structure embedded in a computer readable medium for the particular hierarchical level for which the AS, ARL or TL is generated (National, Regional, Local, Targeted Individual and STB).

Each TL includes but is not limited to a trigger time of day, video stream identifier and a trigger log identifier which identifies the network level (National, Regional, Local and Targeted Individual) and entity (identifier within the network level, STB ID, CO ID, etc.) that generates a particular AS, ARL or TL. The ARL and TL are reported up stream in the IPTV network through each hierarchical level of the network from the STB up to the SHO. In a particular embodiment, an PAS is created at a hierarchical network level and the STB, and each PAS is compared in an AVS to the ARL and TL for each level in the IPTV network and end user device to verify that triggers and advertisements were received for each advertisement identifier, program placement identifier, program placement stream identifier and time of day in the AS. An AS can be generated at any level of the IPTV network for advertisements designated for those end user device served by the network level. Thus a national PAS would be used for the SHO, a regional PAS for the VHO, a local PAS for the JO and an individual targeted or small group targeted PAS at the CO. A targeted AS is generated when an advertisement is intended for less than all end users served by a particular hierarchical level in the IPTV network. Thus a targeted AS can be generated at the National (SHO) 202, Regional 214 (VHO), Local 224 (IO) or Targeted Individual/Small Group level 234 (CO) or STB 244. In a particular embodiment, the STB AS is for advertisements sent from a first STB to a second STB.

Figure 3:
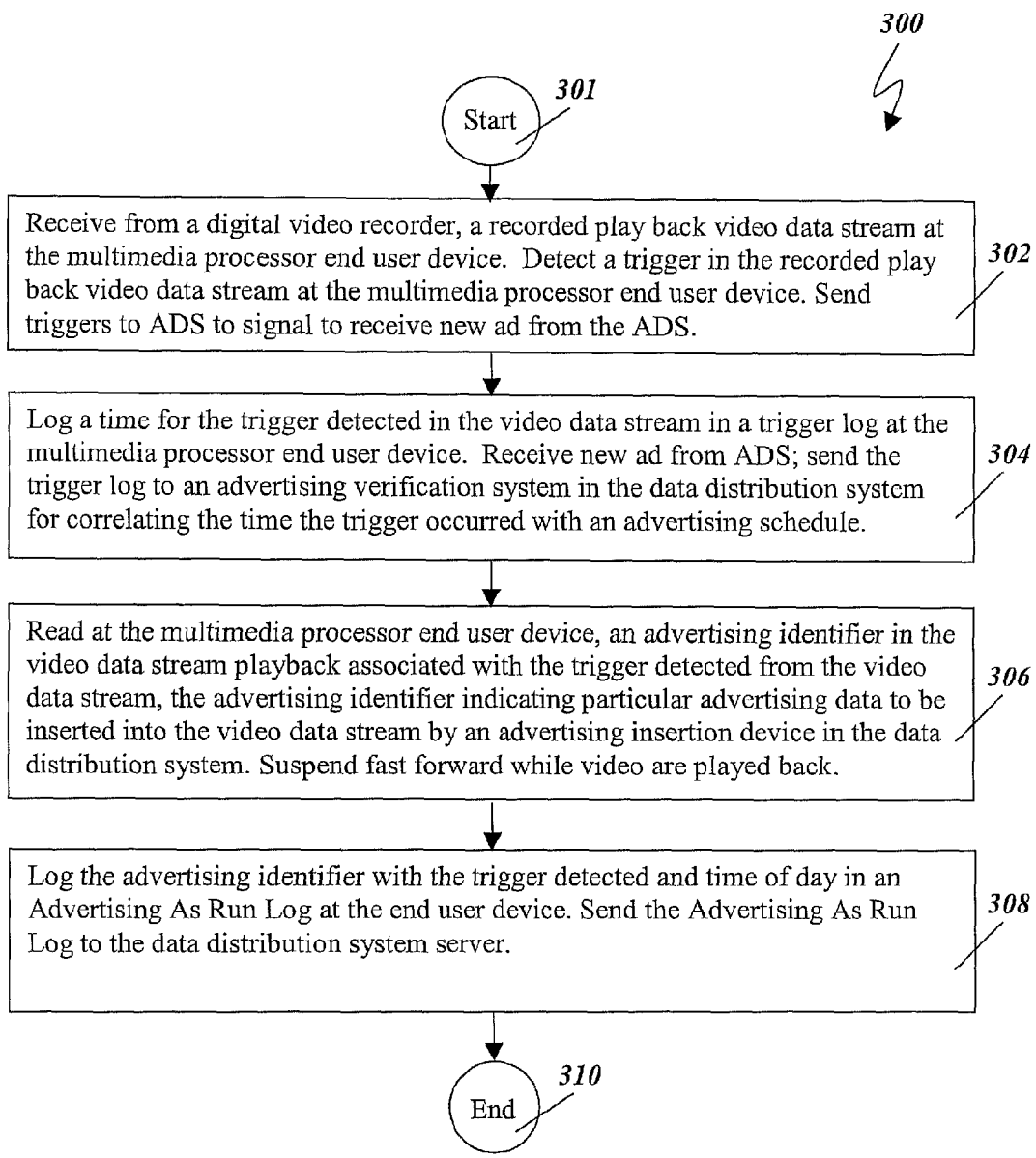
FIG. 3 depicts a flow chart of functions performed in an illustrative embodiment for delivering advertising data.

Turning now to FIG. 3, a flow chart 300 of functions performed in a particular illustrative embodiment is shown. The flow chart is exemplary only and does not imply or dictate an order of execution or functions to be performed, as other embodiments may perform only some of the functions or other functions entirely and not necessarily in the order shown in FIG. 3. The flow chart 300 begins at terminal 301 and proceeds to block 302 in which an illustrative embodiment receives from a data distribution server, the video data stream at the multimedia processor end user device and detects a trigger in the video data stream at the multimedia processor end user device. The flow chart then proceeds to block 304 in which an illustrative embodiment logs a time for the trigger detected in the video data stream in a trigger log data base at the multimedia processor end user device and sends the trigger log data base an advertising verification system 104 in the data distribution system for correlating the time the trigger occurred with an Playback Advertising Schedule.

The flow chart then proceeds to block 306 in which an illustrative embodiment reads at the multimedia processor end user device, an advertising identifier in the video data stream associated with the trigger detected from the video data stream, the advertising identifier indicating particular advertising data inserted into the video data stream by an advertising insertion device in the data distribution system. The flow chart then proceeds to block 306 in which an illustrative embodiment 308 logs the advertising identifier with the trigger detected and time of day in an As Run data base at the end user device and sends the As Run data base to the data distribution system server.

Figure 4:
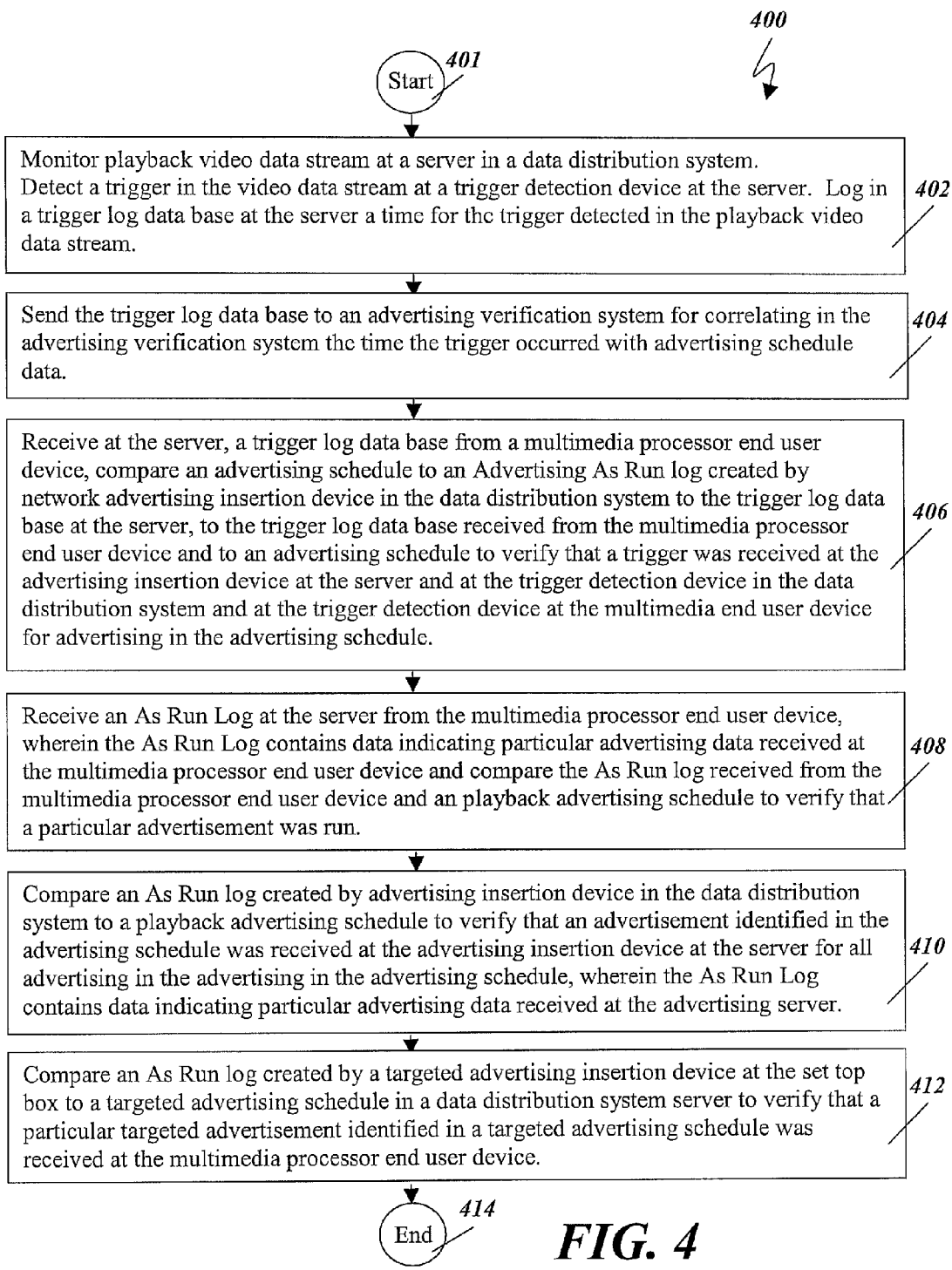
FIG. 4 depicts a flow chart of functions performed in another illustrative embodiment for delivering advertising data.

Turning now to FIG. 4, a flow chart 400 of functions performed in a particular illustrative embodiment is shown. The flow chart is exemplary only and does not imply or dictate an order of execution or functions to be performed, as other embodiments may perform only some of the functions or other functions entirely and not necessarily in the order shown in FIG. 4. The flow chart 400 begins at terminal 401 and proceeds to block 402 in which an illustrative embodiment monitors a video data stream at a server in a data distribution system. An illustrative embodiment detects an advertising trigger in the video data stream at a trigger detection device at the server and logs the trigger in a trigger log data base at the server a time for the trigger detected in the video data stream. At block 404 an illustrative embodiment sends the trigger log data base to an advertising verification system for correlating in the advertising verification system the time the trigger occurred with as Playback Advertising Schedule data. At block 406 an illustrative embodiment receives at the server, a trigger log data base from a multimedia processor end user device, and compares an Playback Advertising Schedule to an As Run log created by network advertising insertion device in the data distribution system to the trigger log data base at the server, to the trigger log data base received from the multimedia processor end user device and to an Playback Advertising Schedule to verify that a trigger was received at the advertising insertion device at the server and at the trigger detection device in the data distribution system and at the trigger detection device at the multimedia end user device for advertising in the Playback Advertising Schedule. The As Run Log contains data indicating particular advertising data inserted by the advertising insertion device in the data distribution system.

At block 408 an illustrative embodiment receives an As Run Log at the server from the multimedia processor end user device, wherein the As Run Log contains data indicating particular advertising data received at the multimedia processor end user device and compares the As Run log received from the multimedia processor end user device and an Playback Advertising Schedule to verify that a particular advertisement was run. At block 410 an illustrative embodiment compares an As Run log created by advertising insertion device in the data distribution system to a Playback Advertising Schedule to verify that an advertisement identified in the Playback Advertising Schedule was received at the advertising insertion device at the server for all advertising in the advertising in the Playback Advertising Schedule. In a particular embodiment the As Run Log contains data indicating particular advertising data received at the advertising insertion device. At block 412 an illustrative embodiment compares an As Run log created by a targeted advertising insertion device at the set top box to a targeted Playback Advertising Schedule in a data distribution system server to verify that a particular targeted advertisement identified in a targeted Playback Advertising Schedule was received at the multimedia processor end user device. At terminal 414 the functions of the particular illustrative embodiment as shown in FIG. 4 end.

Figure 5:
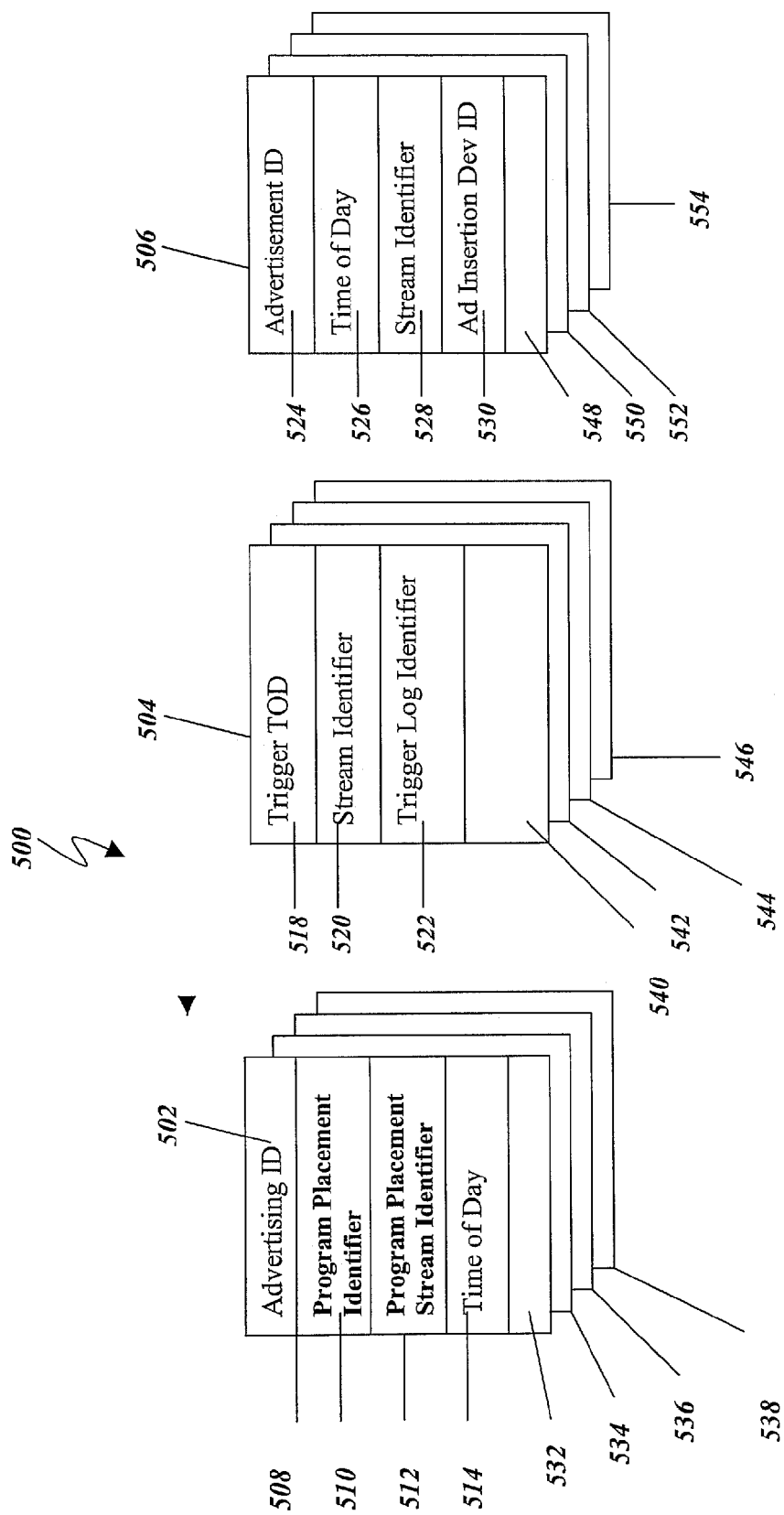
FIG. 5 depicts a data structure embedded in a computer readable medium in an illustrative embodiment.

Turning now to FIG. 5, in a particular illustrative embodiment data structures 500 embedded in a computer readable medium are provided. The data structures 500 include fields for storing data used by an illustrative embodiment of a system, computer program product and method. There are three main data structures and Playback Advertisement Schedule (PAS) 502, Trigger Log(TL) 504 and As Run Log(ARL) 506 which are stored at each level in the ITPV network (national, regional, local and targeted (individual/small group) and STB). A PAS data 502 structure is created in composite pieces as a data structure for each level national 532, regional 534, local 536 and targeted 538 and STB 539. Each PAS data structure includes but is not limited to a first field 508 for storing data indicating an advertisement identifier. In a particular embodiment the advertisement identifier is an ISCI code. The PAS data structure further includes but is not limited to a program placement identifier 510 for identifying a program, such as the "SUPER BOWL™" in which the advertisement identified by the advertising identifier 508 is to be placed. The PAS data structure further includes but is not limited to a program placement stream identifier 512 for identifying a video stream in which a program, such as the "SUPER BOWL™" in which the advertisement identified by the advertising identifier 508 is to be placed. The PAS data structure further includes but is not limited to a time of day 514 for identifying a time of day at which the advertisement identified by the advertising identifier 508 is to be placed the program identified in the program placement identifier.

A Trigger Log 504 aggregate data structure is created in composite pieces as a data structure for each level, national 540, regional 542, local 544 and targeted 546 and STB 437. Each level TL data structure includes but is not limited to a first field 518 for storing data indicating a trigger time of day at which the trigger was identified. The TL data structure further includes but is not limited to a stream identifier 520 for identifying a video data stream, in which the trigger was identified. The TL data structure further includes but is not limited to a trigger log device identifier (TLD ID) 522 for identifying the TLD at which the trigger was detected.

An As Run Log(ARL) 506 data structure is created in composite pieces as a data structure for each level national 548, regional 550, local 552, targeted 554 and STB 555. Each ARL data structure includes but is not limited to a first field 524 for storing data indicating an advertising identifier for an advertisement detected in association with a trigger time of day and stream ID in the TL. The TL further includes but is not limited to a Time of Day (TOD) field 526 for storing data indicating an advertisement time of day at which the advertisement was identified. The TL data structure further includes but is not limited to a stream identifier 528 for identifying a video data stream, in which the advertisement was identified. The TL data structure further includes but is not limited to an advertising insertion device identifier (AID ID) 522 for identifying the AID at which the trigger was detected.

Figure 6:
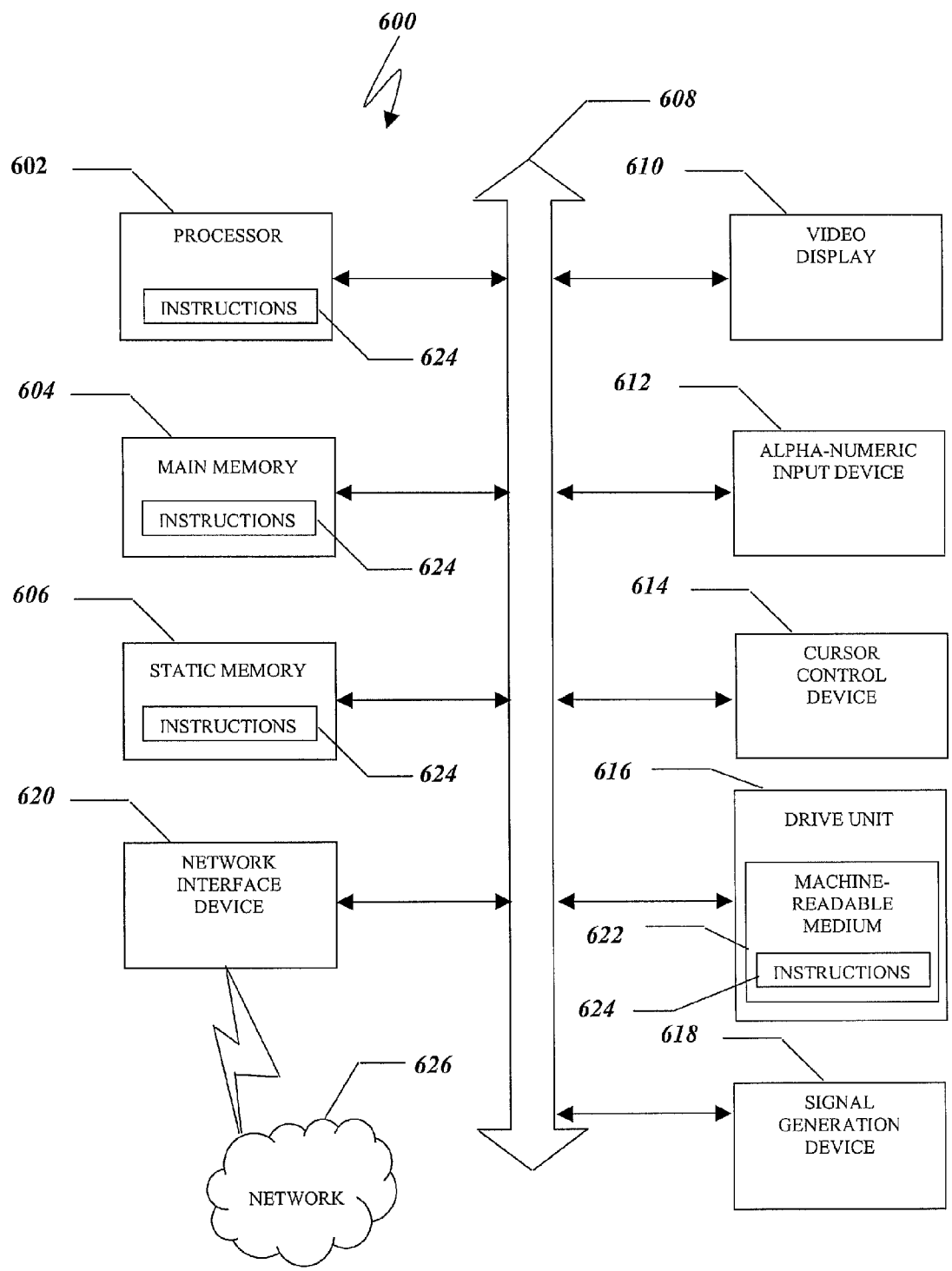
FIG. 6 is an illustrative embodiment of a machine for performing functions disclosed in an illustrative embodiment.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystals display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface.

The disk drive unit 616 may include a machine-readable and computer-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable and computer-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 624, or that which receives and executes instructions 624 so that a device connected to a network environment 626 can send or receive voice, video or data, and to communicate over the network 626 using the instructions 624. The instructions 624 may further be transmitted or received over a network 626 via the network interface device 620. The machine readable medium may also contain a data structure for containing data useful in providing a functional relationship between the data and a machine or computer in an illustrative embodiment of the disclosed system and method.

While the machine-readable and computer-readable medium 622 is shown in an example embodiment to be a single medium, the term "machine-readable and computer-readable medium" should be taken to include a single medium or multiple media (e.g., a centralized or distributed database, and/or associated caches and servers) that store the one or more sets of instructions. The term "machine-readable and computer-readable medium" shall also be taken to include any medium that is capable of storing, encoding or carrying a set of instructions for execution by the machine and that cause the machine to perform any one or more of the methodologies of the present invention. The term "machine-readable and computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable and computer-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computerized method for advertising, the method comprising:
receiving from a data distribution server, a video data stream at a multimedia processor end user device;
storing the video data stream at a digital video recorder;
monitoring a playback of the stored video data stream from the digital video recorder at the multimedia processor end user device;
detecting an electronic signal indicating an advertising trigger in the playback of the video data stream at the multimedia processor end user device, wherein the advertising trigger indicates the beginning of an advertising avail;
logging a time for the trigger detected in the video data stream in a trigger log at the multimedia processor end user device;
sending the trigger log including data to an advertising server, wherein an advertising verification system correlates the time the trigger occurred with an advertising schedule;
detecting an indicator in the video data stream;
sending a request for replacement advertising to an advertising server when the indicator signals that the replacement advertising data is to be received as an advertising data stream from an advertising server;
receiving at the multimedia processor end user device a replacement advertising data stream during the playback of the video data stream from the DVR and displaying a live presentation of the replacement advertising data stream until the advertising video data stream is complete;
receiving replacement advertising data from the DVR when the indicator signals that the replacement advertising data is to be received from storage on the DVR;
resuming playback of the stored video data stream after displaying the replacement advertising data;
reading at the multimedia processor end user device, a playback advertising identifier in the advertising video data associated with the trigger detected from the replacement advertising video data, the advertising identifier indicating particular advertising data logging the advertising identifier with the trigger detected and time of day in an As Run Log at the end user device; and
sending the As Run Log to the data distribution system server.

2. The method of claim 1, the method further comprising: suspending fast forward commands on the DVR during the display streaming of the replacement advertising data.

3. The method of claim 1, wherein the trigger is a Society for Cable Television Engineers 104 trigger and the video data stream is a SDI video data stream.

4. The method of claim 1, wherein the trigger is a Society for Cable Television Engineers 35 trigger and the video data stream is an ASI video data stream.

5. A non-transitory computer readable medium, containing computer executable instructions that when executed by a processor perform functions that stream video data advertising during replay of recorded data, the computer program comprising:
instructions to receive from a data distribution server, a video data stream at a multimedia processor end user device;
instructions to store the video data stream at a digital video recorder;
instructions to monitor a playback of the stored video data stream from the digital video recorder at the multimedia processor end user device;
instructions to detect an electronic signal indicating an advertising trigger in the playback of the video data stream at the multimedia processor end user device, wherein the advertising trigger indicates the beginning of an advertising avail;
instructions to log a time for the trigger detected in the video data stream in a trigger log at the multimedia processor end user device;

instructions to send the trigger log including data to an advertising server so that the advertising verification system can correlate the time the trigger occurred with an advertising schedule;

instructions to detect an indicator in the video data stream;

instructions to send a request for replacement advertising to an advertising server when the indicator signals that the replacement advertising data is to be received as an advertising data stream from an advertising server, instructions to receive at the multimedia processor end user device a replacement advertising data stream from the advertising server based on the advertising trigger during the playback of the video data stream from the DVR;

instructions to display a live presentation of the replacement advertising data stream until the advertising video data stream is complete;

instructions to receive replacement advertising data from the DVR when the indicator signals that the replacement advertising data is to be received from storage on the DVR;

instructions to resume playback of the stored video data stream after displaying the replacement advertising data stream;

instructions to read at the multimedia processor end user device, a playback advertising identifier in the advertising video data associated with the trigger detected from the replacement advertising video data, the advertising identifier indicating particular advertising data;

instructions to log the advertising identifier with the trigger detected and time of day in an As Run Log at the end user device; and instructions to send the As Run Log to the data distribution system server.

6. The medium of claim 5, the computer program further comprising:

instructions to suspend fast forward commands on the DVR during the streaming of the replacement advertising data.

7. The medium of claim 5, wherein the trigger is a Society for Cable Television Engineers 104 trigger and the video data stream is a SDI video data stream.

8. The medium of claim 5, wherein the trigger is a Society for Cable Television Engineers 35 trigger and the video data stream is an ASI video data stream.

9. A computer program product, comprising:

a processor in data communication with a tangible computer readable medium;

a computer program embedded in the tangible computer readable medium, the computer program comprising computer executable instructions that when executed by a processor perform functions to replace advertising data during replay of recorded video data, the computer program comprising:

instructions to receive from a data distribution server, a video data stream at a multimedia processor end user device;

instructions to store the video data stream at a digital video recorder;

instructions to monitor a playback of the stored video data stream from the digital video recorder at the multimedia processor end user device;

instructions to detect an advertising trigger in the playback of the video data stream at the multimedia processor end user device;

instructions to log a time for the trigger detected in the video data stream in a trigger log at the multimedia processor end user device;

instructions to send the trigger log including data to an advertising server so that the advertising verification system can correlate the time the trigger occurred with an advertising schedule;

instructions to detect an indicator in the video data stream;

instructions to send a request for replacement advertising to an advertising server when the indicator signals that the replacement advertising data is to be received as an advertising data stream from an advertising server, instructions to receive at the multimedia processor end user device a replacement advertising data stream from the advertising server based on the advertising trigger during the playback of the video data stream from the DVR and instructions to display a live presentation of the replacement advertising data stream until the advertising video data stream is complete;

instructions to receive and display replacement advertising data from the DVR when the indicator signals that the replacement advertising data is to be received from storage on the DVR;

instructions to resume playback of the stored video data after displaying the replacement advertising data;

instructions to read at the multimedia processor end user device, a playback advertising identifier in the advertising video data associated with the trigger detected from the replacement advertising video data, the advertising identifier indicating particular advertising data in the data distribution system;

instructions to log the advertising identifier with the trigger detected and time of day in an As Run Log at the end user device; and instructions to send the As Run Log to the data distribution system server.

10. The computer program product of claim 9, the computer program further comprising:

instructions to suspend fast forward commands on the DVR during the display of the replacement advertising data stream.

11. The computer program product of claim 9, wherein the trigger is a Society for Cable Television Engineers 104 trigger and the video data stream is a SDI video data stream.

12. The computer program product of claim 9, wherein the trigger is a Society for Cable Television Engineers 35 trigger and the video data stream is an ASI video data stream.

* * * * *